Sept. 13, 1966  R. BREHER  3,271,845
METHOD OF MANUFACTURING ROTARY VALVES
Filed Jan. 23, 1962  3 Sheets-Sheet 1
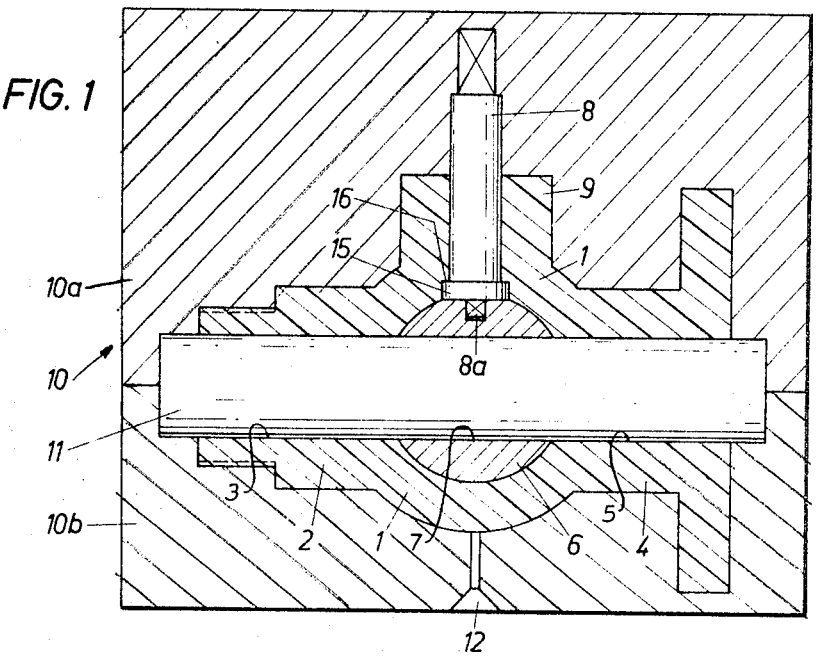
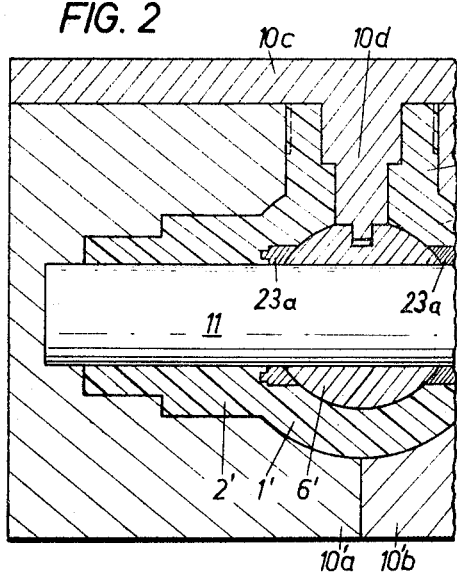
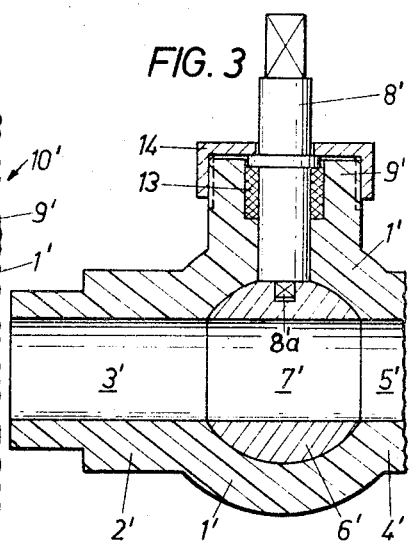
Inventor:
RUDOLF BREHER
BY
ATTORNEY.

Sept. 13, 1966  R. BREHER  3,271,845
METHOD OF MANUFACTURING ROTARY VALVES
Filed Jan. 23, 1962  3 Sheets-Sheet 2
FIG. 4
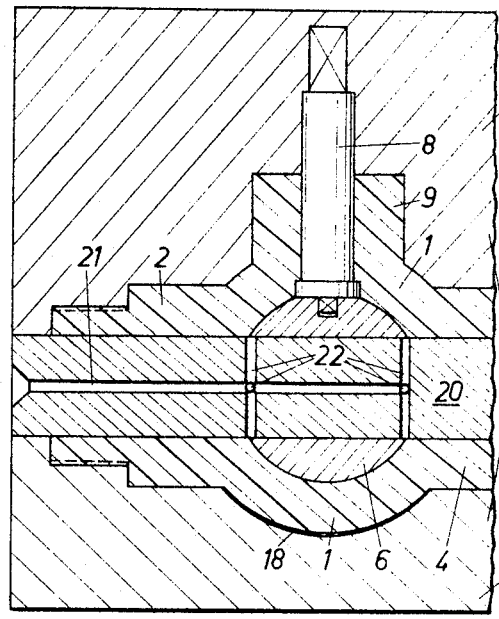
FIG. 5
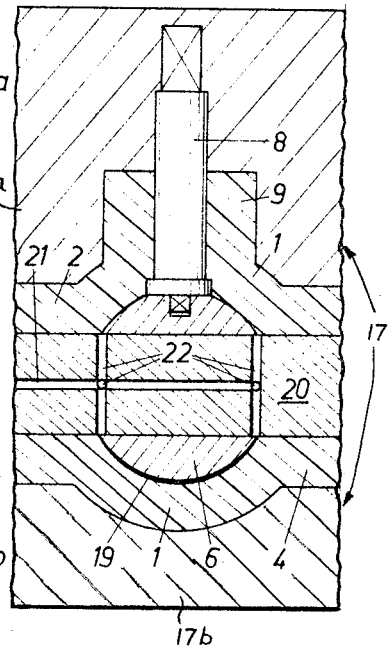
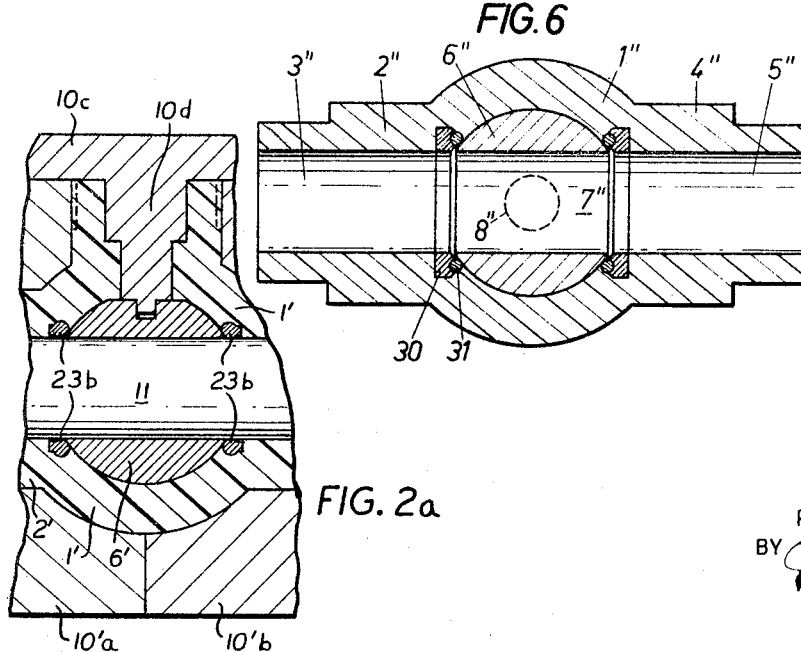
FIG. 6
FIG. 2a
Inventor:
RUDOLF BREHER
BY
ATTORNEY.

United States Patent Office 3,271,845
Patented Sept. 13, 1966

3,271,845
METHOD OF MANUFACTURING ROTARY VALVES
Rudolf Breher, Hausberge an der Porta, Germany, assignor to Friedrich Stubbe, Vlotho (Weser), Germany
Filed Jan. 23, 1962, Ser. No. 168,105
Claims priority, application Germany, Feb. 11, 1961, St 17,453; Sept. 6, 1961, St 18,290
4 Claims. (Cl. 29—157.1)

The present invention relates to a method of manufacturing rotary valves including a housing and a rotary member rotatably mounted in the housing and having a passage registerable with inlet and outlet branches of the valve housing. The present invention is particularly concerned with a method of manufacturing such rotary valves having a housing of synthetic material made by injection molding or press-molding.

Rotary valves are known to have the advantage of a rapid opening and closing operation and are thus widely used in applications where rapid or instantaneous opening and closing of a conduit is required. In addition the use of suitable plastics for the valves affords resistance against acids, lyes, gases and other corrosive media.

Known rotary valves, particularly ball valves, which comprise a multi-part housing, the parts of which are manufactured separately and are assembled about the rotary member have the following drawbacks. The housing parts must be prepared with great precision, in order to achieve a safe sealing and, thereby, to prevent a premature wear of the sealing elements. The separate manufacture of the housing parts and the great precision required therefor increase, of necessity, the costs of manufacturing the valves.

Another drawback of these valve resides in the fact, that sealing members, as i.e. sealing rings or sealing flanges, must additionally be incorporated, in order to bring about a safe sealing of the rotary member relative to the housing in the closing position of the rotary member. The insertion of the sealing members creates, however, larger or smaller dead zones, through which the flowing media cannot pass or at least with difficulty, so that deposits from the media can set in the dead zones or transformations or decompositions of the media can occur therein. These valves cannot be applied, quite often, to liquids or gases containing solids, for instance in the food industry or in the chemical industry.

In order to avoid the above-stated drawbacks, it has been proposed before, to make the housing with its branches as an integral body of synthetic material. To achieve this end the prefabricated rotary member is inserted, as a core for the space of the rotary member in the housing, into a mold formed complementary to the outer configuration of the housing and of its branches, whereupon the housing is formed in the mold by pouring, pressing or spraying suitable plastic material, whereby the rotary member is surrounded by the plastic material. A rotary member equipped with a passage requires to be sealed off, in order to prevent the entry of plastic material into the passage during the molding of the housing around the rotary member. Since this procedure is extremely difficult, it has been proposed to use a solid rotary member and to mold a housing having solid branches. In a separate following working step a passage is bored into the branches of the housing, simultaneously boring a passage through the rotary member. This additional working step and the losses of material cause, however, not only extensive additional manufacturing costs, but also rough internal surfaces in the passages. It is for this reason, that the last-mentioned method did not find acceptance and the first-mentioned known method of manufacturing the multi-part housing, by making separately each of the parts, has been continued.

It is, therefore, one object of the present invention to provide a method of manufacturing rotary valves which avoids the drawbacks of the known methods.

It is another object of the present invention to provide a method of manufacturing rotary valves by molding a unitary housing in rapid, simple, convenient and economical manner of a suitable plastic material, which rotary valves are absolutely reliable and seal completely and which also have no dead spaces.

It is another object of the present invention to provide a method of manufacturing rotary valves, wherein prefabricated sealing rings tightly engaging the rotary member are set on the rod which forms the core for the housing branches, which sealing rings are inserted into the mold together with the core.

Since the sealing rings are fabricated prior to the manufacture of the housing, they have been subjected to the shrinking process already, at the time the shrinking process of the housing takes place. Furthermore, sealing rings of synthetic material have a certain elasticity. This elasticity of the prefabricated sealing ring, not participating in the shrinking process of the housing, suffices surprisingly, to equalize the above stated disadvantageous shrinking occurrences of the housing such, that the sealing faces formed by the sealing rings do not engage the rotary member too closely, so that the rotary member would not be rotatable any more, nor do the sealing faces lift from the rotary member, in which case no more sealing would be possible. The sealing rings are surrounded by the synthetic material at their faces not engaging the rotary member, so that no dead spaces can be formed, as it occurs in connection with the sealing rings referred to above and built-in thereafter. Due to the embedding of the sealing rings into the housing no additional securing means are required and the sealing rings cannot change their position upon rotation of the rotary member.

With these and other objects in view, which will become apparent in the following detailed description, the present invention will be clearly understood in connection with the accompanying drawings, in which:

FIG. 1 is an axial section of an injection mold with a ball valve molded therein;

FIG. 2 is a section of another embodiment of an injection mold with a valve molded therein, a portion of the mold being cut away;

FIG. 2a is a section of the same embodiment of the injection mold shown in FIG. 2, with a variation in the sealing ring, portions of the mold being cut away;

FIG. 3 is an axial section of a valve produced in the mold shown in FIG. 2, a portion of the valve being cut away;

FIG. 4 is a fragmentary section of an inflation mold enclosing a valve with the housing in non-inflated condition;

FIG. 5 is a section similar to that shown in FIG. 4, disclosing the valve after inflation of the housing;

FIG. 6 is an axial section of another embodiment of the valve; and

Figure 7:
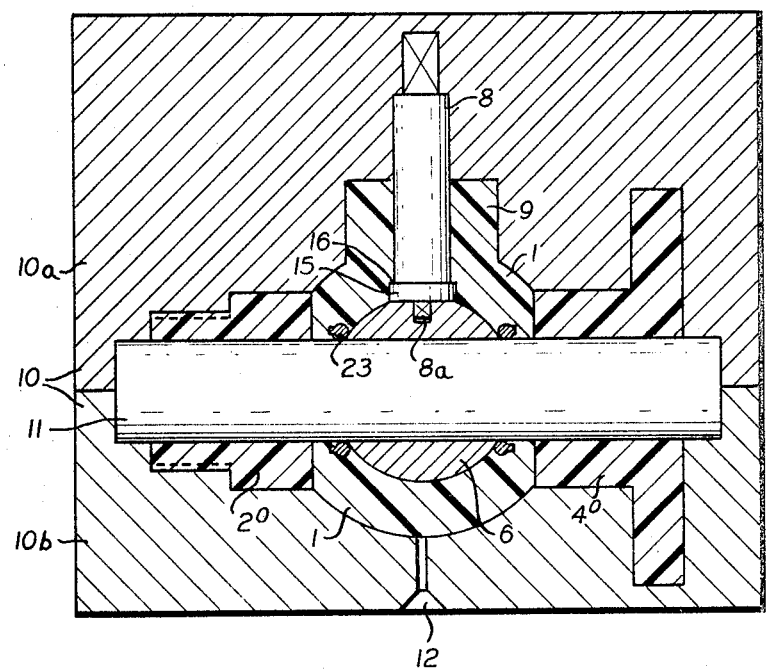
FIG. 7 is an axial section of the valve produced with prefabricated branches.

Referring now to the drawings, and in particular to FIG. 3, a rotary ball valve is shown comprising a housing 1', an inlet branch 2' having a flow passage 3' and an outlet branch 4' having a flow passage 5'. The flow direction may, of course, be reversed. The housing 1' forms with its corresponding branches 2' and 4' a unitary plastic body. A rotary ball valve member 6' provided with a flow passage 7' is rotatably mounted in the housing 1', which flow passage 7' connects in the open position, as illustrated in FIG. 3, the flow passages 3' and 5' of the branches 2' and 4'. The turning of the rotary ball valve member 6' is obtained by means of a spindle 8' having a square end 8'a engaging the rotary ball valve member 6'. The spindle 8' is borne in a branched-off housing part 9' which surrounds the spindle 8'. Prefabricated sealing rings 23' are embedded in the housing 1', which sealing rings 23' engage closely the rotary member 6'.

Referring now to FIG. 1, which discloses the manufacturing method, one embodiment of an injection mold 10 is disclosed which consists of the two mold halves 10a and 10b. The injection mold 10 corresponds to the outer configuration of the housing 1 and of the housing branches 2 and 4. During the manufacturing operation there is inserted in the mold 10, while in its open position, a rod 11 as a core adapted to form the flow passages 3 and 5 of the housing branches 2 and 4, the rod 11 being supported and sealingly surrounded at its ends by the mold halves 10a and 10b. The rod 11 passes through the flow passage 7 of the rotary member 6 and projects from both sides of the rotary member 6, so that the latter is supported in the injection mold 10 by the rod 11, and at the same time the flow passage of the rotary member 6 is sealed off by the rod 11. A sealing ring 23 slides on both sides of the rod 11 and is tightly pushed toward the rotary member 6. The sealing rings 23 have been manufactured before in known manner of synthetic material.

The mold 10 is then closed, with the spindle 8 in place, by joining together the mold halves 10a and 10b, and the plastic is injected into the mold 10 through an injection nozzle 12. In this manner the housing 1 with its branches 2 and 4 is formed as a unitary element of plastic, as shown in FIG. 1. The mold inserts or cores surrounded by the plastic material, constituted by the ball 6, by the spindle 8 and by the rod 11 remain in the mold 10, in usual manner, until the plastic or synthetic material has sufficiently cooled and set. The mold 10 is then opened, that means the mold halves 10a and 10b are taken apart, the rotary valve is removed therefrom and the rod 11 is pulled out of the rotary valve. To facilitate its removal, the rod 11 may have a non-cylindrical form, for example it may be slightly conical or it may consist of several parts.

Referring now again to the drawings, and in particular to FIG. 2, a three-part injection mold 10' consisting of the parts 10'a, 10'b and 10'c is disclosed. The mold part 10'c has a projection 10d which extends into the housing branch 9' adapted to receive the spindle 8' of the valve. The mold parts 10'a and 10'b form a screw thread on the outside face of the branch 9'. The valve is manufactured in the embodiment of FIG. 2 by the same method as described above in connection with the embodiment disclosed in FIG. 1. After the valve has been removed from the mold 10' (FIG. 3), the spindle 8' is inserted, which is equipped, for instance, with sealing rings, sealing collars or as shown in the drawing, with a gland packing 13 which seals the spindle 8' against the branch 9'. The spindle 8' is retained against axial movement by a screw collar 14 mounted on the branch 9'.

As can be seen, for example, in FIG. 2, the wall of the housing is of enlarged thickness at the locations at which the circular edges are disposed in the interior of the housing, at the border of the space for the rotary member into the flow passages of the housing branches. It is at these locations that the surface of the rotary member forms a seal in the closed position of the rotary member with the inner wall of the housing. The wall thickness can be particularly large at these locations of the housing, if for example, the wall thickness of the entire housing is chosen anyhow very large in order to achieve a high compressive strength and where furthermore the outer face of the housing is only slightly rounded, to improve the appearance thereof. In these cases, it is possible that the material shrinking during cooling in the mold contracts, and that the housing is no longer in such tight engagement with the rotary member, as to secure a durable and unobjectionable sealing. Prefabricated rings 23a or 23b (FIGS. 2 and 2a) are mounted, therefore, on the rod 11 and have been inserted in the mold together with the rod 11.

In FIG. 2 the ring 23a is disclosed to constitute one embodiment, and in FIG. 2a the ring 23b is disclosed, to constitute a second embodiment thereof. The rings 23a and 23b can be made of the same material as that of the housing, since knowingly thin walled parts made of many thermoplastic synthetic materials, as sealings rings, have sufficient elasticity, as it is required for sealing rings. The rings 23a has a predetermined cross-section of the housing 1' and is disposed at and complements the inner surface of the housing. The ring 23b is of substantially circular cross-section. The rings may be made of the same material as the housing. The sealing rings 23a and 23b are in tight engagement with the rotary member 6 and are embedded in the plastic during the encasing of the rotary member 6, and reduce the wall thickness of the cooling material, so that the housing engages tightly the rotary member 6 at the above locations and makes possible a perfect seal.

It has been found that the hard material, of which the housing is made, in order to attain a high compressive strength, may be subject to scratches on the sealing surfaces when the valve is used for soiled media. This is the case, for instance, especially if gritty water flows through the valve, so that upon operation of the rotary member the sealing surfaces of the rotary member and of the inner wall of the housing may easily be scratched by the hard sand particles. Such scratches in the sealing faces cause the valve to cease being water-tight. It has been found, however, that such occurrences of wear on the sealing faces over a longer time period of use can be avoided by using sealing rings of a soft, wear-resistant material. Yet, it has been observed that in valves made with sealing rings in the above-described manner, the sealing rings of soft material may easily be lifted off the rod 11 at some point of their circumference, so that at this point plastic may easily be squeezed between the rod 11 and the sealing ring. As a consequence at that particular point the sealing surface of the housing is not formed by the sealing ring, but instead by the hard plastic of the housing which at that location has penetrated between the sealing ring and the rod 11 into engagement with the rotary member 6. This happening can occur especially, if particularly soft materials are used for the sealing ring, if the plastic for the housing is of a thin liquid and if the injection takes place at high pressures.

The above-stated disadvantages can be avoided according to a further feature of the present invention, by prefabricating the sealing rings of a soft, elastic material and by holding them on the rod 11 and tightly engaging the rotary member 6 by means of retaining bushings which are prefabricated of the same or similarly hard material as that used for the housing. The retaining bushings are immovably mounted on the rod, and on their side facing the rotary member, they surround closely the sealing rings by means of a groove receiving the sealing rings.

FIG. 6 shows an embodiment of such a rotary valve in section. During the manufacture of the rotary valve in the above-described manner a rod (not shown in FIG. 6) is inserted into the flow passage 7" of the rotary member 6". Prefabricated retaining bushings 30 having sealing rings 31 inserted therein, are mounted on the rod, on both sides of the rotary member 6", retaining the bushings and being moved towards the rotary member 6", so that the sealing rings 31 are in tight engagement with the rotary member 6". The bore of the retaining bushings 30 is dimensioned in such a way, that the retaining bushings cannot freely slide on the rod (not shown in FIG. 6). The sealing rings 31 are embedded in the retaining bushings, that means surrounded by the retaining bushings 30 in such manner, that during the molding of the housing no plastic can leak through between the retaining bushings 30 and the sealing rings 31, and the latter cannot be displaced from their predetermined position.

By this procedure it is possible to achieve that no grooves and similar wear appearances can occur on the sealing surfaces even by strongly soiled media, which would bring about small leakages. The retaining bushings 30 for the sealing rings 31 are suitably made of the same material which is used for the housing or are made of a similarly hard material, so that, on the one hand, the wall of the housing is not subjected to a reduction of its compressive strength, and on the other hand, a good connection, safe against relative rotation, between the retaining bushings and the housing is assured. For the sealing rings, however, wear resistant, softer materials are to be used, which are resistant under circumstances even to corrosive media. Depending upon the type of the flowing medium, for instance, rubbery sealing rings of butadiene-copolymers with acrylonitrile or sealing rings of non-wetting polymers, namely fluorine-containing polymeric halogenated olefins, can be used.

To simplify and lower the cost of the manufacturing process, as shown in FIG. 1, the spindle 8 itself has been used as a mold insert or core for the branch 9 of the housing 1 which surrounds the spindle 8; in this case the spindle 8 is provided with an annular flange 15 and has its square tip 8a in engagement with the rotary member 6. During the molding of plastic material around the cores, the spindle 8 is solidly and hermetically encased by the plastic material, so that the annular flange 15 prevents axial movement of the spindle 8 within the branch 9. If the medium flowing through the valve should happen to leak between the housing 1 and the rotary member 6 and press on the underside of the annular flange 15, the latter will be pushed strongly against the seat 16 formed by the branch 9, so that a safe seal is provided and the medium cannot emerge from the housing by passing the spindle 8.

The method according to the present invention thus has the advantage, that rotary valves of synthetic material can be manufactured simply and cheaply. Since the rotary member of the valve engages sealingly and rigidly the inner wall of the housing equipped with the sealing ring and, in the closed position of the valve, is additionally pressed against the sealing surfaces by the pressure of the medium, a satisfactory seal is obtained, without the need of additional sealing elements. Furthermore, the valve does not contain any dead zones in which deposits of the stagnant medium may settle or in which decompositions or the like of the stagnant medium may occur. Furthermore, by performing the method according to the present invention gland packings or other additional packings for sealing the spindle can be eliminated. The valve produced by the method according to the present invention, is, therefore, highly suitable for handling of sludgy liquids, for the chemical, food and similar industries, where high standards are set for shut-off valves.

The method according to the present invention enables the housing to be manufactured of selectively suitable plastics and allows the use of selectively suitable materials for the rotary member, depending upon the type of flowing medium and upon the other requirements which are set for the resistance of the valve. Thus, for example, the rotary member can be made of hard rubber, glass, porcelain or corosion resistant steel. It is, however, also possible to make the rotary member of plastic. Several possibilities are available in this instance. It is possible to use for the rotary member a plastic which does not bind with the plastic used for the housing and which has a higher melting point than the plastic used for the housing; thus, for example, the rotary member may be made of polytetrafluorethylene, while for the housing use is made of low pressure polyethylene, which upon encasing the rotary member does not bind with the latter, and the melting point of which is so low that the rotary member, around which the injection molding takes place, does not soften. If a plastic material is used for the housing, which plastic material binds with the plastic of the rotary member, in spite of the fact that the plastic material of the housing has a low melting point, the rotary member may, for example, be provided with a coating of lacquer which prevents a binding of the two plastics.

The method according to the present invention makes it possible to shape the branches of the housing in any desired manner, so that the rotary valve may be connected in any selective manner with piping to be connected. FIG. 1 shows by way of example a screw-threaded branch 2 to which piping may be screwed and a flanged branch 4 to which piping may be flange-connected.

FIG. 2 shows as a further example a welding branch 2′, on the attenuated end of which may be slid a pipe (not shown) which may be cemented or welded to the branch 2′.

According to a further feature of the present invention, it is possible to mount on the rod 11 prefabricated branches or portions thereof, which are set in the mold together with the rod, such prefabricated branches 2° and 4° being shown in FIG. 7.

This arrangement provides by way of example the following possibilities:

It is possible to connect branches of metal during the manufacture of the valve with the plastic material of the housing, when metal pipes are to be screwed on or to be welded to the valve. It is possible, however, also to provide a metal branch on one side of the valve, to enable a connection to be made in the simplest possible manner between iron or steel pipes and plastic pipes by means of the valve. Furthermore, the housing branches may be prefabricated of a predetermined plastic which welds especially well and easily with the plastic of the piping which is to be connected to the valve. Furthermore, the housing branches may be made of a transparent material, which allows observation of the flow in the conduit, as is frequently desired.

Due to the fact that plastics, depending, for example, upon their coefficient of expansion or upon the wall thickness of the fabricated parts, shrink to a greater or lesser extent upon cooling in the mold, the rotary member is more or less tightly encased by the shrunken plastic of the housing. Under certain conditions and upon using certain plastics in the above-described method according to the present invention, this known phenomenon may bring about a result, according to which the rotary member is engaged too tightly with the non-sealing faces, that means, faces which are not equipped with a sealing ring, in the housing and can be rotated only with difficulty. This occurrence may be avoided by coating the rotary member, before it is encased in plastic in the mold, with a thin layer of soluble material which, after the rotary member has been encased, is removed by means of a solvent which has no corrosive effect on the rotary member or on the housing. For example, the coating may consist of a thin layer of lacquer or plastic, which is later dissolved by means of a solvent or is destroyed or decomposed by means of a solvent, for example an acid. The choice of materials for the coating and for the solvent must be made merely in such manner, that the plastic material used for the housing and the plastic material used for the rotary member are not attacked.

The objects of the present invention, as stated above, may, however, be achieved in a particularly simple and advantageous manner by the method disclosed in FIGS. 4 and 5. The valve, as it is taken out of the injection mold 10 (FIG. 1), is placed in a second mold formed as an inflation mold 17 (FIG. 4) which consists of two mold halves 17a and 17b. The parts of the housing 1 which surround the rotary member 6 are enclosed by the inflation mold 17 with a limited amount of play or clearance 18, which is shown at an exaggerated scale in FIG. 4 for the sake of clarity. The remaining parts of the housing 1, such as the branches 2 and 4 and the branch 9 of the housing, which branch 9 surrounds the spindle 8, are, however, tightly enclosed by the inflation mold. The warm, deformable housing 1 is now inflated against the walls of the inflation mold 17 by means of pressure fed into the inflation mold 17 (FIG. 5), so that also the part of housing 1 which surrounds the rotary member 6 now engages tightly the wall of the inflation mold 17. By this procedure a small play 19 is created between the rotary member 6 and the inner surface of the housing, which is shown at an exaggerated scale in FIG. 5, for the sake of clarity. The rotary member 6 has sufficient play in the valve, which now is taken out of the inflation mold 17, so that the rotary member 6 is seated in the valve with enough clearance to allow it to be turned easily. The inflation mold 17 is formed in such manner, that the circular edges in the interior of the housing at the point where the space for the rotary member borders with the flow passages of the branches 2 and 4, are not inflated outwardly so that these edges or surfaces, which cooperate in the closed position with the rotary member surfaces to effect the seal, remain always in tight engagement with the rotary member. Since those parts only of the housing 1 which are not in tight engagement with the inner surface of the inflation mold 17, are subjected to the inflation operation, the inflating pressure can be fed without difficulty into the interior of the valve through the flow passages of the housing branches 2 and 4. It is also possible, however, to use, as shown in FIGS. 4 and 5, a core 20 having an axial bore 21 and radial bores 22, which core 20 is inserted into the housing branches 2 and 4, and the inflating pressure being supplied through the axial and radial bores. The heating of the valve required for the inflation may be effected by heating the inflation mold 17 or by heating the valve in a heating chamber prior to its insertion into the inflation mold 17. Advantageously, however, the valve is removed from the first mold 10, while it is still sufficiently warm and it is inserted immediately into the inflation mold 17, thus economizing the energy and expense of a second heating step. By the foregoing method it is thus possible, in those cases where the rotary member sits too tightly in the housing, to achieve simply and cheaply easier rotation of the rotary member.

While I have disclosed several embodiments of the present invention, it is to be understood that these embodiments are given by example only and not in a limiting sense, the scope of the present invention being determined by the objects and the claims.

I claim:

1. A method of manufacturing a rotary valve having a molded housing of synthetic material formed integrally with connecting branches and a rotary member having a spindle rotatably mounted in said housing, comprising the steps of prefabricating a rotary member with a passage therethrough, prefabricating sealing rings of plastic material, mounting said rotary member and said sealing rings on a core extending through and beyond both ends of the passage of said rotary member with said sealing rings tightly engaging said rotary member, inserting said rotary member jointly with said core and said sealing rings into a confined space of an inner configuration complementary to the outer configuration of said housing, said core being adapted to form passages for said connecting branches, molding said housing within said confined space around said rotary member and around said core and said sealing rings, and removing the finished product from said confined space and removing said core from said rotary member, said housing and said sealing rings after said synthetic material of said housing has set.

2. The method, as set forth in claim 1, which includes the steps of prefabricating said sealing rings of a soft, elastic material, prefabricating retaining bushings of a hard plastic material and forming an annular groove in said bushings, said groove being adapted to receive and to tightly surround a corresponding sealing ring therein, and mounting said retaining bushings, jointly with said sealing rings, on said core for immovably retaining said bushings on said core.

3. The method, as set forth in claim 1, which includes the step of mounting prefabricated connecting branches on said core prior to the insertion of the latter into said confined space.

4. A method of manufacturing a rotary valve having a molded housing of synthetic material formed integrally with connecting branches and a rotary member having a spindle rotatably mounted in said housing, comprising the steps of mounting a rotary member on a core extending through and beyond both ends of the passage of said rotary member, inserting said rotary member jointly with said core into a confined space of an inner configuration complementary to the outer configuration of said housing, said core being adapted to form passages for said connecting branches, molding said housing within said confined space around said rotary member and around said core, removing the finished product from said confined space and removing said core from said rotary member and said housing after said synthetic material of said housing has set, inserting said finished product after removing of said core into a second confined space of the same inner configuration as that of said first confined space but including play at the portion of said housing surrounding said rotary member and tightly engaging the other portion of said housing, and inflating said housing while in hot state within said second confined space, whereby play is created between the outer surface of said rotary member and the inner surface of said housing, to free the rotary member for rotation.

References Cited by the Examiner
UNITED STATES PATENTS

| | | |
|---|---|---|
| 20,395 | 5/1858 | Wood. |
| 2,038,304 | 4/1936 | Middler. |
| 2,221,921 | 11/1940 | Le Beau _____ 29—157.1 X |
| 2,387,013 | 10/1945 | Fuller _____ 29—157.1 |
| 2,747,905 | 5/1956 | Clade _____ 29—157.1 X |
| 2,932,081 | 4/1960 | Witte. |

JOHN F. CAMPBELL, *Primary Examiner.*

HYLAND BIGOT, WHITMORE A. WILTZ, *Examiners.*

J. D. HOBART, *Assistant Examiner.*